(12) United States Patent
Yoshii

(10) Patent No.: US 6,558,777 B2
(45) Date of Patent: May 6, 2003

(54) CORRUGATED CARDBOARD PLATES, METHOD OF AND APPARATUS FOR MAKING THE SAME

(75) Inventor: Hisashi Yoshii, Okayama (JP)

(73) Assignee: Daizen Kabushiki Kaisha, Okayama (JP)

( * ) Notice: Subject to any disclaimer, the term of this patent is extended or adjusted under 35 U.S.C. 154(b) by 91 days.

(21) Appl. No.: 09/725,302

(22) Filed: Nov. 29, 2000

(65) Prior Publication Data

US 2002/0064629 A1 May 30, 2002

(51) Int. Cl.$^7$ .................... B32B 3/28; B32B 31/00; A01J 21/00
(52) U.S. Cl. .................. 428/182; 428/184; 425/328; 425/322; 156/250; 156/260; 156/262; 156/510; 156/512; 156/522
(58) Field of Search .................. 156/205, 207, 156/522, 250, 260, 517, 262, 516, 538, 264, 266, 510, 512; 428/182, 184; 425/336, 237, 328, 322, 374

(56) References Cited

U.S. PATENT DOCUMENTS 2,501,180 A * 3/1950 Kunz .................. 428/184
5,411,786 A * 5/1995 Fuo .................. 428/184
5,520,982 A * 5/1996 Grigsby et al. .................. 428/184
5,681,641 A * 10/1997 Grigsby et al. .................. 428/184

OTHER PUBLICATIONS

Patent Abstract of Japan; Publication No. 11235773 A, published Aug. 31, 1999, entitled "Apparatus and Method for Manufacture of Honeycomb Structure"; Yoshii Hisashi.

* cited by examiner

Primary Examiner—Donald J. Loney
(74) Attorney, Agent, or Firm—Sughrue Mion, PLLC

(57) ABSTRACT

Corrugated cardboard plates are made by laminating and bonding corrugated cardboards 1, each including a corrugated sheet 1a and at least one liner sheet 1b bonded to the corrugated sheet 1a, to provide a corrugated cardboard laminate 5, which is in turn cut along a plurality of cutting lines b lying perpendicular to a direction parallel to ridge lines a of the corrugated sheet 1a to provide a plurality of corrugated blocks 7. The corrugated blocks 7 are then arrayed in a line to provide an elongated flat corrugated plank 9 in which the top face of one of the corrugated blocks 7 is bonded to the bottom face of the next adjoining corrugated block 7. At least one backing sheet 11a or 11b, made of paper, to one of opposite surfaces of the elongated flat corrugated plank 9 and is subsequently cut into a plurality of corrugated cardboard plates 14 of a predetermined size. In this way, the corrugated cardboard plates 14 or 90 can be obtained at a reduced cost, each of the plates 14 or 90 having an excellent heat insulation, a sound insulation and being lightweight and robust.

10 Claims, 9 Drawing Sheets

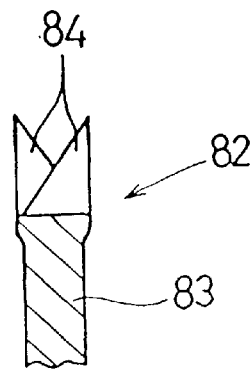
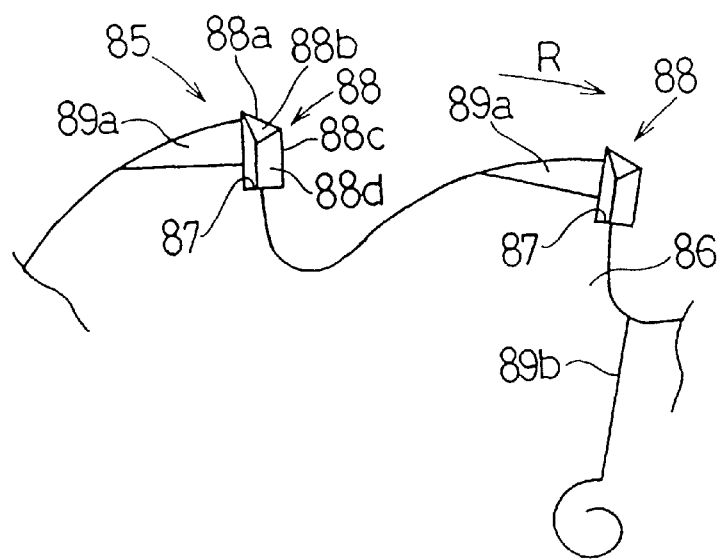
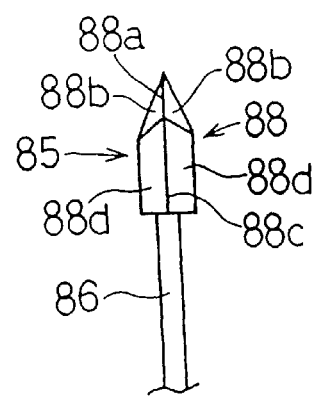
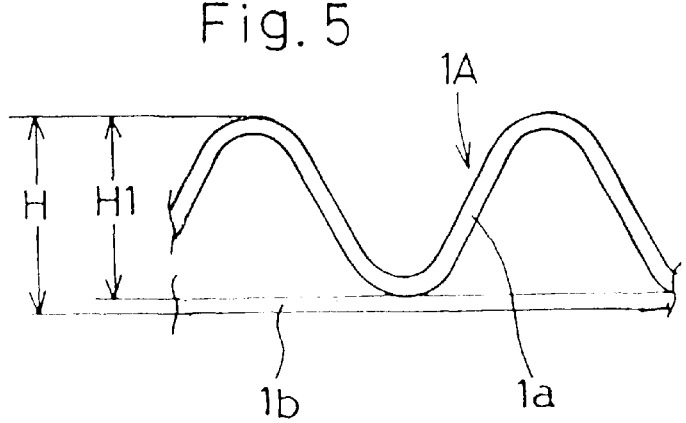

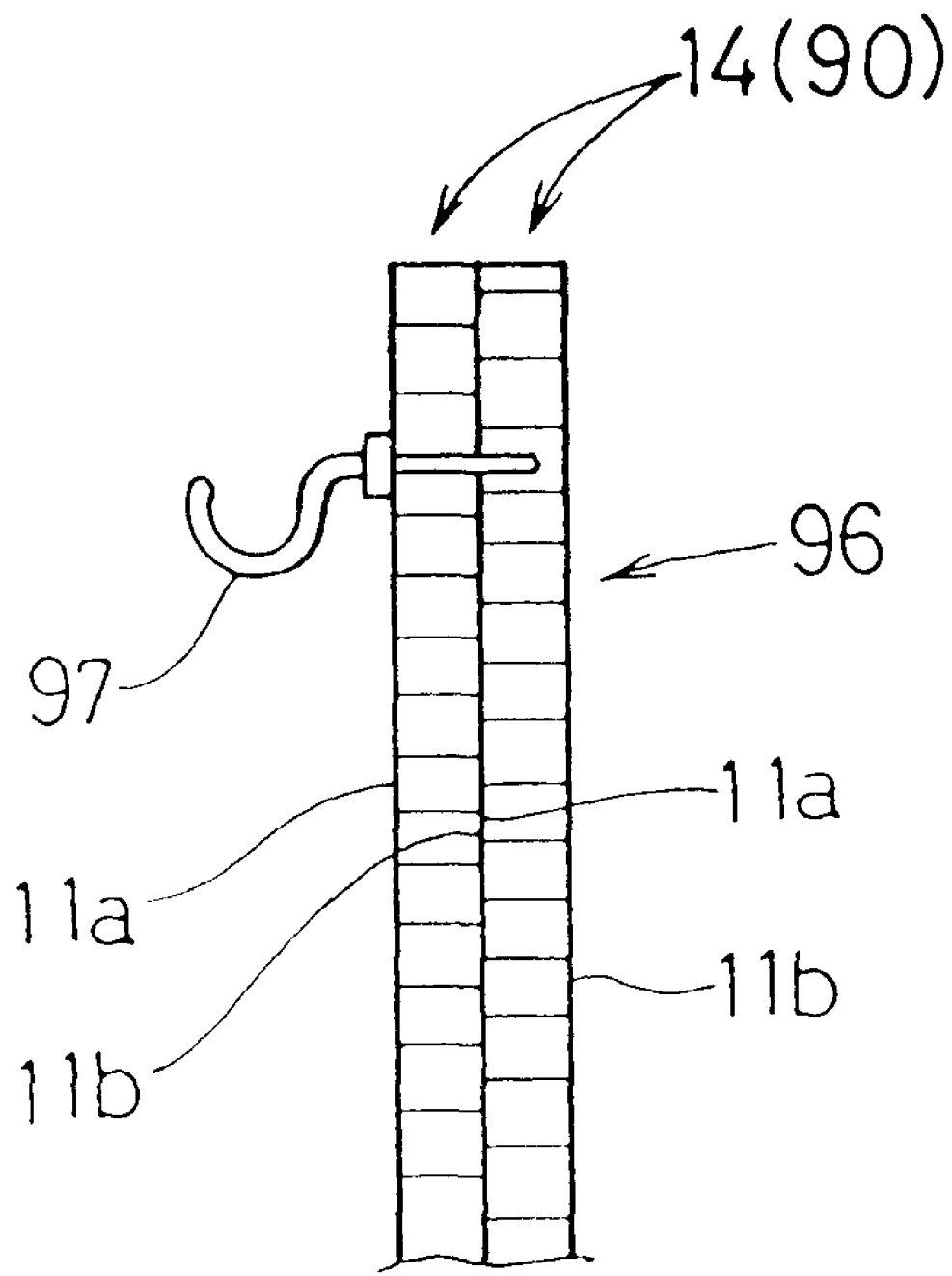

BENDING TEST RESULTS

| SAMPLE | A | | B | | REFERENCE | |
|---|---|---|---|---|---|---|
| BENDING DIRECTION | LENGTH-WISE | WIDTH-WISE | LENGTH-WISE | WIDTH-WISE | LENGTH-WISE | WIDTH-WISE |
| TESTING TIMES 1 | 73 | 63 | 69 | 115 | 68 | 129 |
| 2 | 69 | 83 | 65 | 127 | 68 | 83 |
| 3 | 88 | 96 | 69 | 103 | 70 | 54 |
| 4 | 65 | 82 | 85 | 81 | 68 | 65 |
| 5 | 76 | 74 | 73 | 74 | 73 | 53 |
| AVERAGE | 74.2 | 79.6 | 72.2 | 100 | 69.4 | 76.8 |
| PER UNITARY LENGTH (100mm) | 29.7 | 26.5 | 28.9 | 33.3 | 27.8 | 25.6 |

UNIT: Kg

CORRUGATED CARDBOARD PLATES, METHOD OF AND APPARATUS FOR MAKING THE SAME

BACKGROUND OF THE INVENTION

1. Field of the Invention

The present invention relates to corrugated cardboard plates, a method of and an apparatus for making the corrugated cardboard plates from corrugated cardboards that are excellent in heat insulation and sound insulation, and have a lightweight feature and a strength. The present invention also relates to the corrugated cardboard plates and architectural elements utilizing the corrugated cardboard plates.

2. Description of the Prior Art

The assignee of the present invention has applied for patent on an apparatus for and a method of continuously manufacturing a honeycomb structure that can be used as a material for furniture and architectures (the Japanese Laid-open Patent Publication No. 11-235773). This honeycomb structure is lightweight and has cells exhibiting an extremely high compressive strength and is excellent in heat insulation and sound insulation. However, the apparatus for making the honeycomb structure tends to become somewhat complicated.

More specifically, the honeycomb structure is prepared by laminating a plurality of paper materials for forming honeycomb cells to provide a honeycomb core material, then forming honeycomb units by cutting the laminate of the paper materials in a direction perpendicular to the honeycomb cells while the latter are closed, successively connecting the honeycomb units, with upper and lower faces bonded together, to provide an elongated honeycomb core, and bonding a sheet to a cut face (front and rear sides) of the elongated honeycomb core to provide the honeycomb structure. However, at the time the honeycomb units are formed by cutting the honeycomb core material, a relatively large cutting force is required since the cutting is performed while the honeycomb cells are closed. For this reason, a guillotine cutter comprising a single knife blade and capable of exerting a higher cutting force than a saw tooth is employed for cutting the honeycomb core material. However, the use of the guillotine cutter results in a smooth cut face (a face where an adhesive is to be applied) and, therefore, the adhesive applied will not be satisfactorily retained on the cut faces of the honeycomb units, with the consequence that the sheet will not be firmly bonded to the elongated honeycomb core. In view of this, while the cells of the honeycomb units are expanded by the use of an expander, the front and rear faces of each honeycomb units where the adhesive is to be subsequently applied is roughened by the use of a surface roughening device. As such, the manufacture of the honeycomb structure requires the use of the surface roughening device and the expander.

SUMMARY OF THE INVENTION

The present invention is intended to provide corrugated cardboard plates at a reduced cost, wherein corrugated cardboards are employed in place of the above discussed honeycomb core materials, wherein the sheet can be assuredly and firmly bonded with no surface roughening being required, and which has a performance comparable or higher than that exhibited when the honeycomb core materials are used.

Another important object of the present invention is to provide an architectural material wherein the corrugated cardboard plates are used so that it can be suitably and optimally used as a floor panel, a partition wall for use in restaurants and offices or an external wall for a temporary dwelling, all of which have an excellent lightweight feature and an excellent thermal insulation.

In order to accomplish these objects of the present invention, a method of making corrugated cardboard plates according to the present invention includes a step of laminating and bonding a plurality of corrugated cardboards to provide a corrugated cardboard laminate, each of the corrugated cardboards including a corrugated sheet and at least one liner sheet bonded to the corrugated sheet, the corrugated sheet having a plurality of cells and a corresponding number of ridges; a step of cutting the corrugated cardboard laminate along a plurality of cutting lines lying perpendicular to a direction in which the ridges of the corrugated sheet extend, to provide a plurality of corrugated blocks, each of the corrugated blocks having upper and lower faces opposite to each other; a step of arraying the corrugated blocks in a line to provide an elongated flat corrugated plank in which the top face of one of the corrugated blocks is bonded to the bottom face of the next adjoining corrugated block; a step of bonding at least one backing sheet, made of paper, to one of opposite surfaces of the elongated flat corrugated plank; and a step of cutting the elongated flat corrugated plank into a plurality of corrugated cardboard plates of a predetermined size. The corrugated sheet referred to above is a sheet corrugated at regular intervals so that cells can be formed in the corrugated cardboard, which cells may have a generally U-shaped (or sinusoidal) section, a generally V-shaped section or a trapezoidal section.

With the above described corrugated cardboard plate making method, when the corrugated cardboard laminate is to be cut along cutting lines lying perpendicular to ridge lines of the corrugated sheet into a plurality of corrugated blocks, not a guillotine cutter including a single knife blade, but a circular saw or a band saw including a body having its tip formed with rows of equally spaced saw teeth or a so-called raking saw having a plurality of equally spaced saw teeth that are alternately offset laterally relative to each other to provide two rows of alternating saw teeth, can advantageously be employed. In other words, since the corrugated cardboard laminate is of a design wherein corrugated cardboards are laminated together with the cells left open and does not require a relatively large force during the cutting thereof, the use of the circular saw, the band saw or the ranking saw is possible. For this reason, cut faces of each of the corrugated cardboard blocks resulting from cutting of the corrugated cardboard laminate can be suitably roughened and, therefore, by applying an adhesive to the cut faces of each of the corrugated cardboard blocks optimally, the sheet can be assuredly and firmly bonded. Accordingly, no surface roughening need not be performed with the use of the surface roughening device and the expander such as required in the previously suggested apparatus. Accordingly, it is possible to continuously manufacture at a reduced cost the corrugated cardboard plates having excellent heat and sound insulations and being lightweight and robust and, yet, capable of exhibiting a performance comparable to or higher than that exhibited by the use of the honeycomb core material.

An apparatus for making corrugated cardboard plates according to the present invention includes a laminating machine for making a corrugated cardboard laminate by laminating and bonding a plurality of corrugated cardboards, each of the corrugated cardboards including a corrugated sheet and at least one liner sheet bonded to the corrugated sheet, the corrugated sheet having a plurality of cells and a corresponding number of ridges; a corrugated block former for making a plurality of corrugated blocks by cutting the corrugated cardboard laminate along a plurality of cutting lines lying perpendicular to a direction in which the ridges of the corrugated sheet extend, each of the corrugated blocks having upper and lower faces opposite to each other; a corrugated plank preformer for making an elongated flat corrugated plank by arraying the corrugated blocks in a line, in which the top face of one of the corrugated blocks is bonded to the bottom face of the next adjoining corrugated block; a corrugated plank former for making a continuous strip of corrugated plank by bonding at least one backing sheet, made of paper, to one of opposite surfaces of the elongated flat corrugated plank; and a corrugated plate former for cutting the elongated flat corrugated plank into a plurality of corrugated cardboard plates of a predetermined size.

The corrugated cardboard plate making method of the present invention can easily be practiced by the use of the corrugated cardboard plate making apparatus of the structure described above.

In a preferred embodiment of the present invention, during the formation of the corrugated blocks or in the corrugated block former performing the formation of the corrugated blocks, bent portions are formed at opposite ends of the corrugated sheet, that are positioned on front and rear sides thereof, so as to extend in a direction parallel to the front and rear sides by means of cutting performed by a cutter. The presence of these bent portions is effective to increase the physical strength of the corrugated sheet. Moreover, when the sheet is bonded to one or both of front and rear sides, the bonding surface area can increase because of the presence of the bent portions and, therefore, the bonding strength of the sheet can be increased.

A corrugated cardboard plate according to the present invention is the one manufactured by the method or the apparatus of the present invention. This corrugated cardboard plate is of a structure wherein a plurality of corrugated cardboards each including a corrugated sheet and at least one liner sheet bonded to the corrugated sheet are laminated and bonded together, said corrugated cardboard plate comprising the corrugated cardboards having front and rear sides thereof lying in a direction perpendicular to a direction conforming to ridges of the corrugated sheet.

The corrugated cardboard plate of the present invention is excellent in heat insulation and sound insulation and, also, lightweight and has a strength and, therefore, can be used as a floor panel, a partition wall, an external wall, a load bearing pallet, a core material for a table, a counter or a shelf, a core material for audio appliances or office automation appliances, a cushioning material for packages, a corner member for packaging, or a filter when filled with a mass of titanium oxide or activated carbon particles, or an element for a heat exchanger. Thus, the corrugated cardboard plate of the present invention can find a variety of applications.

In a preferred embodiment of the present invention, the corrugated sheet forming the corrugated cardboard plate has end portions positioned on the front and rear sides, respectively, and bent in a direction conforming to the front and rear sides thereof.

In another preferred embodiment of the present invention, each of the bent portions has a length within the range of 1.0 to 5.0 times the thickness of the corrugated sheet. By so doing, the physical strength of the corrugated cardboard plate can be increased and bonding of the sheet to the bent portions can be assuredly achieved. At this time, if the length of each of the bent portions is chosen to be of a value smaller than 1.0 times the thickness of the corrugated sheet, no sufficient physical strength can be obtained and no sufficient bonding of the sheet can also be obtained. On the other hand, if the length of each bent portion is chosen to be of a value greater than 5.0 times the thickness of the corrugated sheet, no simplified and efficient formation of the bent portions is possible. In other words, the corrugated cardboard plate is prepared by cutting corrugated cardboard laminates into a plurality of corrugated cardboard blocks by the use of a saw, which blocks are in turn connected together with upper and lower faces thereof bonded with each other. Therefore, if the bent portions are formed by the utilization of margins left at the cut ends of each of the corrugated cardboard block at the time of cutting by means of the saw, no separate manufacturing step is required and the bent portions can advantageously be formed simultaneously with the cutting. However, if the length of each of the bent portions exceeds a value greater than 5.0 times the thickness of the corrugated sheet, simultaneous formation of the bent portions with the cutting saw will become difficult. Accordingly, in order for the bent portions to be formed efficiently by the utilization of the manufacturing step of the corrugated cardboard plates, the length of each of the bent portion should be within the specific range as described above. Also, since the corrugated cardboard plate of the structure described above is excellent particularly in physical strength, it can be optimally utilized when used as material for the load bearing pallet, the furniture or the core material for the rack.

In a further preferred embodiment of the present invention, the corrugated sheet has cells of a height within the range of 5 to 15 mm. If the cells in the corrugated sheet has a height within this range, a relatively small number of the corrugated cardboard is sufficient to provide the corrugated cardboard plate of a predetermined size. In other words, since the height of the cells in the standard corrugated cardboard is generally within the range of 1.1 to 4.8 mm, a relatively large number of the standard corrugated cardboards is required to produce the corrugated cardboard plate of a predetermined size and results in increase of the weight of the resultant corrugated cardboard plate. Also, from the standpoint of saving of the limited resources, it is problematic. However, if the corrugated cardboards having a relatively large cell height as discussed above, which is generally referred to as "Oni Dan" or Big Cell Corrugate, is used, a relatively small number of the corrugated cardboards is sufficient to produce the corrugated cardboard plate of a predetermined size. The corrugated cardboard plate so manufactured is lightweight and resource-saving and, yet, brings about a favorable workability at the time of manufacture thereof. If the height of the cells in the corrugated sheet is smaller than 5 mm, a relatively large number of the corrugated cardboards would be required to produce the corrugated cardboard plate of a predetermined size as is the case with the standard corrugated cardboards. On the other hand, if the height of the cells in the corrugated cardboard is greater than 15 mm, it may result in reduction of the weight, but the strength will be insufficient. Accordingly, the height of the cells in the corrugated cardboard should be within the range specified above.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 3 is a sectional view, on an enlarged scale, of a circular saw which can be used to provide corrugated cardboard blocks;

FIG. 4A is a side view of a portion of a chip saw which can be employed to provide the corrugated cardboard blocks;

FIG. 4B is a front elevational view of that portion of the chip saw shown in FIG. 4A;

FIG. 5 is a plan view, on an enlarged scale, showing a corrugated cardboard;

FIG. 11 is a schematic perspective view showing the corrugated cardboard plates assembled into a partition wall member;

DETAILED DESCRIPTION OF THE EMBODIMENTS

Preferred embodiments of the present invention will now be described with reference to the accompanying drawings.

Figure 1:
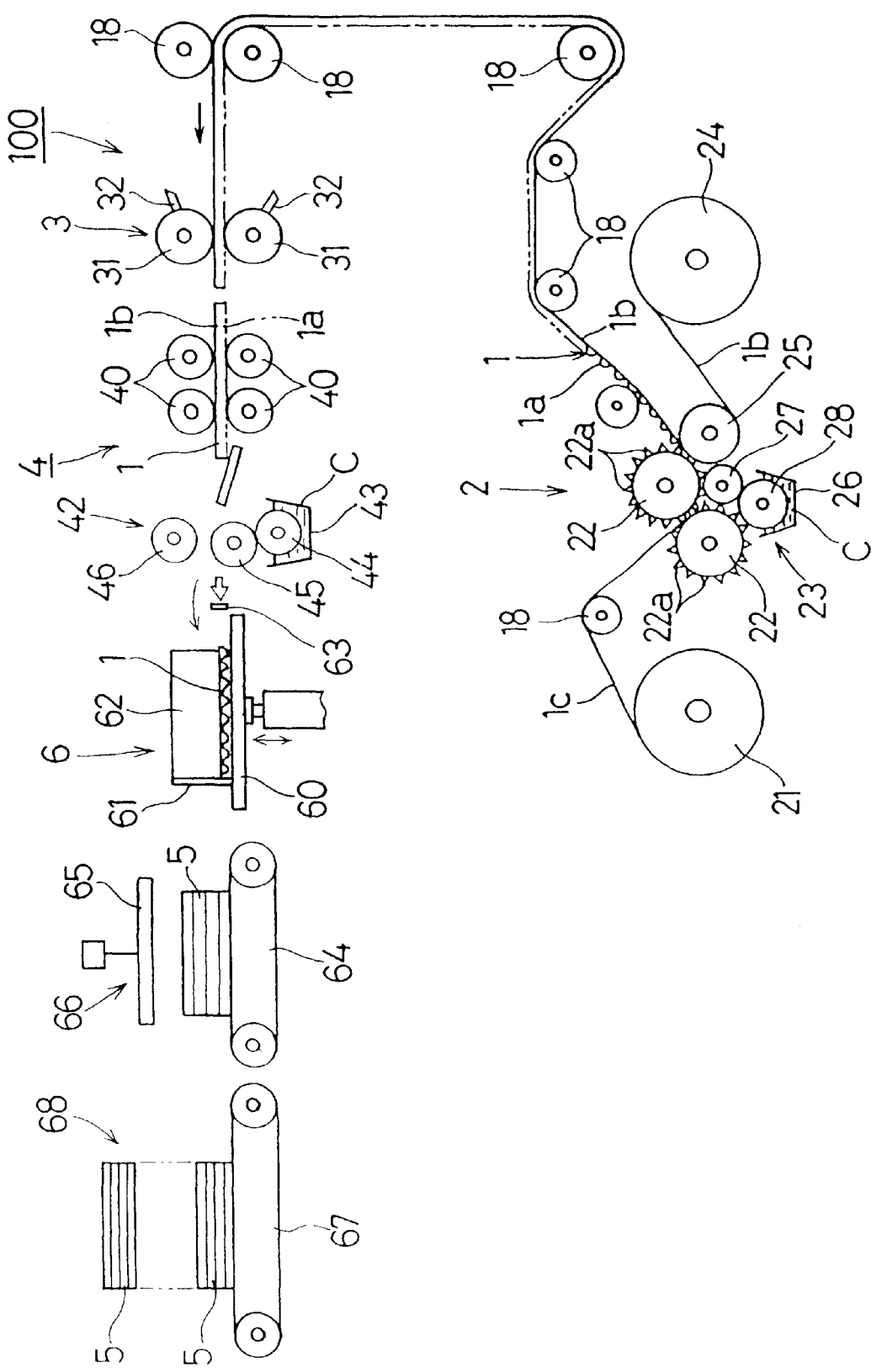
FIG. 1 is a schematic side view of a portion of an apparatus for manufacturing corrugated cardboard plates.
Figure 2:
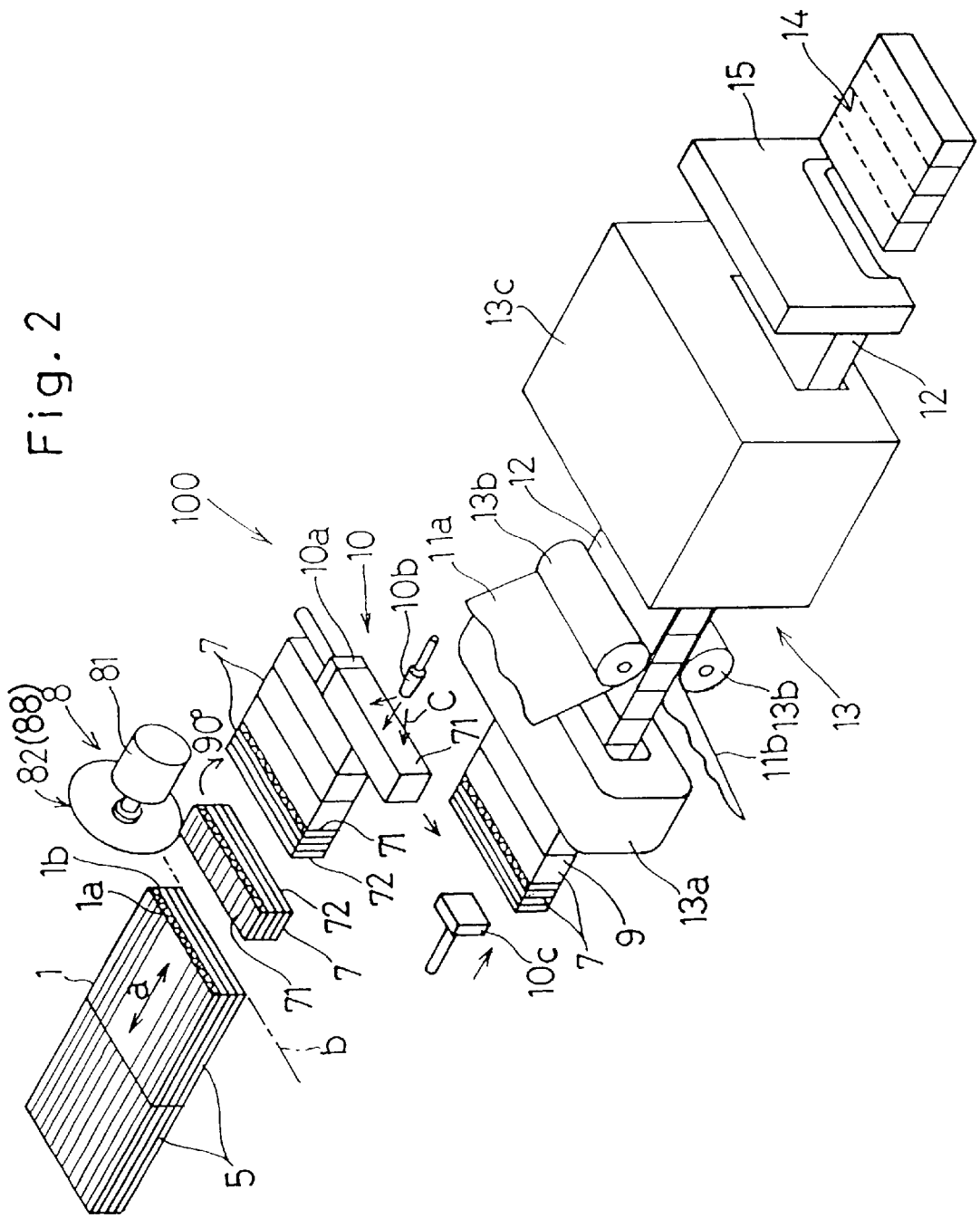
FIG. 2 is a schematic perspective view of the remaining portion of the corrugated cardboard plate manufacturing apparatus shown in FIG. 1.

Referring first to FIGS. 1 and 2, there is shown an apparatus 100 for manufacturing flat corrugated cardboard plates each made up of a plurality of corrugated cardboards laminated together. It is to be noted that for the convenience of drawing, the cardboard plate manufacturing apparatus 100 is divided into two units which are shown in FIGS. 1 and 2, respectively. As shown in FIG. 1, the cardboard plate manufacturing apparatus 100 includes a corrugated fiberboard former 2 for making a continuous strip of corrugated fiberboard 1A made up of a corrugated sheet 1a and a liner sheet 1b bonded to the corrugated sheet 1a, a cutting machine 3 including a pair of juxtaposed rotary drums 31 and 31 and cutter blades 32 and 32 mounted on the respective rotary drums 31 and 31 for cutting the continuous strip of corrugated fiberboard 1A into a plurality of corrugated cardboards 1 of a predetermined length, a transport and sizing machine 4 for successively applying an adhesive to an upper surface of the corrugated sheet 1a while each of the corrugated cardboards 1 is transported, and a laminating machine 6 for laminating a plurality of the corrugated cardboards 1 together to provide a corrugated cardboard laminate 5. The corrugated fiberboard former 2 may be installed on, for example, a ground floor or a first floor of a factory while the cutting machine 3, the transport and sizing machine 4 and the laminating machine 6 may be installed on the second floor of the factory, to maximize the efficiency of utilization of the space available in the factory.

The corrugated fiberboard former 2 referred to above includes a first supply roll 21 around which a strip of sheet 1c used as the corrugated sheet 1a is would; a pair of juxtaposed corrugating rolls 22 and 22 each having a plurality of circumferentially equally spaced protrusions 22a formed on its outer peripheral surface and cooperable with each other to form the strip of sheet 1c, drawn outwardly from the first supply roll 21, into the corrugated sheet 1a; a first sizing unit 23 for applying an adhesive to an undersurface of the resultant corrugated sheet 1a; a second supply roll 24 around which a strip of liner sheet 1b is wound; and a presser roll 25 for pressing the liner sheet 1b, drawn outwardly from the second supply roll 24, against the corrugated sheet 1a to bond the liner sheet 1b to the undersurface of the corrugated sheet 1a. The first sizing unit 23 includes a vessel 26 containing a quantity of adhesive C in a liquid state, and an adhesive applicator roller 27 for applying the adhesive C to the undersurface of the corrugated sheet 1a, and an adhesive transfer roller 28 partly submerged into the quantity of the adhesive C within the vessel 26 for transferring it to the adhesive applicator roller 27 during rotation thereof. It is to be noted in the corrugated fiberboard former 2 of the structure described above, the sheet 1c for the corrugated sheet 1a and the liner sheet 1b may be reversed in position relative to each other so that the liner sheet 1b can be bonded to an upper surface of the corrugated sheet 1a.

The transport and sizing machine 4 includes pairs of juxtaposed skipper rollers 40 and 40 adapted to be driven at a high speed in unison with each other to successively fly the corrugated cardboards 1, which have been cut by the cutting machine 3, in a rearward direction opposite to the cutting machine 3; a guide plate 41 for receiving and guiding one at a time the corrugated cardboards 1 which have been successively flied from the skipper rollers 40 and 40; and a second sizing unit 42 for applying an adhesive to the undersurface of the corrugated sheet 1a of each of the corrugated cardboard 1. The second sizing unit 42 referred to above includes a vessel 43 containing a quantity of adhesive C in a liquid state; an applicator roller 44 for applying the adhesive C to an undersurface of the corrugated sheet 1a of each of the corrugated cardboards 1, an adhesive transfer roller 45 partly submerged into the quantity of the adhesive C within the vessel 43 for transferring it to the adhesive applicator roller 45 during rotation thereof; and a presser roller 46 for pressing the corrugated cardboard 1 from above to thereby ensure application of the adhesive C to the undersurface of the corrugated sheet 1a of each of the corrugated cardboards 1. Each of the corrugated cardboards 1 flied successively from the skipper rollers 40 and 40 is guided by the guide plate 41 so as to travel through a nipping region between the adhesive applicator roller 44 and the presser roller 46, and during the travel of each of the corrugated cardboards 1 through the nipping regions, the adhesive C is applied to the underside of each corrugated cardboard 1, that is, the corrugated sheet 1a thereof by means of the adhesive applicator roller 44.

It is to be noted that before each of the corrugated cardboards 1, successively cut by the cutting machine 3 from the continuous strip of corrugated fiberboard 1A, is supplied to the transfer and sizing machine 4, a second liner sheet preformed to have a size identical with that of the liner sheet 1b of the corrugated cardboard 1 may be bonded to the underside of the respective corrugated cardboard 1 to provide a so-called "double-lined corrugated cardboard", in which case the second sizing unit 42 has to apply the adhesive to the undersurface of the second liner sheet.

The laminating machine 6 includes an elevating table 60 equipped with one or a plurality of hydraulic or pneumatic double-acting cylinders; a first stopper plate 61 mounted atop the elevating table 60 for aligning respective leading ends of the corrugated cardboards 1 successively fed onto the elevating table 60 from the second sizing unit 42 with respect to the direction of transport; a second stopper plate 62 mounted atop the elevating table 60 for aligning respective sides of the corrugated cardboards 1 successively fed onto the elevating table 60 from the second sizing unit 42; a longitudinal pusher 63 for pressing respective trailing ends of the corrugated cardboards 1 resting on the elevating table 60 so that all of the leading ends of the corrugated cardboards 1 on the elevating table 60 can be brought into contact with the first stopper plate 61 to align with each other; and a transverse pusher (not shown) for pressing respective sides of the corrugated cardboards 1 on the elevating table 60 opposite to the second stopper plate 62 so that all of the sides of the corrugated cardboards 1 adjacent the second stopper plate 62 can be brought into contact with the second stopper plate 62 to align with each other.

This laminating machine 4 is so designed and so structured that the elevating table 60 can receive the corrugated cardboards 1 which are successively flied through the nipping region between the adhesive applicator roller 44 and the presser roller 46 and are then stacked on the elevating table 60 in a predetermined number, for example, ten. Thus, it will readily be seen that when the stack of the predetermined number of the corrugated cardboards 1 is formed on the elevating table 60, all of them are bonded and, hence, laminated together to provide the corrugated cardboard laminate 5.

A press unit 66 is positioned downstream of the elevating table 60 with respect to the direction of transport. This press unit 66 includes a conveyor 64 for receiving the stack of the corrugated cardboards 1 delivered from the elevating table 60 by means of a delivery device (not shown), and a weight applicator unit 65 for applying a weight from above to the stack of the corrugated cardboards 1 to forcibly bond the corrugated cardboards 1 together at an increased bonding strength to thereby complete the corrugated cardboard laminate 5. Positioned downstream of the presser unit 66 with respect to the direction of transport is a stack transporting unit 68 including a conveyor 67 for receiving a plurality of corrugated cardboard laminates 5 from the press unit 66 by means of a stacking machine (not shown) or a robot (also not shown) and for subsequently transporting the corrugated cardboard laminates 5, stacked on the conveyor 67, to the next processing station which will be described subsequently with reference to FIG. 2.

In the embodiment so far shown in FIG. 1, the path of transport of the strip of sheet 1c and the liner sheet 1a from the first and second supply rolls 21 and 24 to the cutting machine 3 has a plurality of guide rollers 18 disposed therealong.

As shown in FIG. 2 that is continued from FIG. 1, the cardboard plate manufacturing apparatus 100 also includes a corrugated block former 8 for cutting each of the corrugated cardboard laminates 5, which have been transported by the stack transporting unit 68, along a cutting line b defined so as to extend in a direction perpendicular to the longitudinal sense of any one of ridges a of the corrugated sheet 1a to provide a plurality of corrugated blocks 7; a corrugated plank preformer 10 for providing a generally elongated flat corrugated plank 9 by joining a plurality of corrugated blocks 7 while a top face 71 of one of the corrugated blocks 7, which has been one of opposite end surfaces of the respective corrugated cardboard laminate 5 with respect to the direction of lamination of the corrugated cardboards 1, is joined with a bottom surface 72 of the preceding corrugated lock 7, which has been the other of the opposite end surfaces of the corrugated cardboard laminate 5; a corrugated plank former 13 for providing a continuous strip of corrugated plank 12 by bonding first and second webs of backing sheets 11a and 11b to opposite perforated surfaces of the elongated flat corrugated plank 9, respectively, which perforated surfaces mean a respective surface of the elongated flat corrugated plank 9 where a multiplicity of cells defined in the corrugated cardboard open outwardly; and a cutting machine 15 for cutting the continuous strip of corrugated plank 12 transverse to the longitudinal sense thereof into a plurality of corrugated cardboard plates 14 of a predetermined size.

In the illustrated embodiment, the corrugated block former 8 makes use of a rotary cutter 82 equipped with a drive motor 81, which cutter 82 may be of a type generally employed for cutting purpose. As shown in FIG. 3, the rotary cutter 82 includes a rotary disc 83 having an outer periphery formed with a plurality of circumferentially equally spaced saw teeth 84 that are alternately offset laterally relative to each other to provide two rows of alternating saw teeth.

Alternatively, the corrugated block former 8 may make use of a circular chip saw 85 (such as disclosed in the Japanese Laid-open Patent Publication No. 10-337687) as shown in FIGS. 4A and 4B. The circular chip saw 85 includes a rotary disc 86 having its outer periphery formed with a multiplicity of chip seats 87, and a cutting chip 88 fixed to each of the chip seats 87 and having a blade thickness greater than the thickness of the rotary disc 86. The cutting chip 88 is of a design including a first blade ridge 88a inclined downwardly with respect to the direction of rotation of the rotary cutter shown by the arrow so that a leading end of the first blade ridge 88a lies at a level lower than a trailing end thereof with respect to the direction of rotation, and first slant faces 88b inclined radially upwardly so as to symmetrically converge at the first blade ridge 88a. This cutting chip 88 also includes a second blade ridge 88c extending from the leading end of the first blade ridge 88a in a direction radially inwardly of the rotary disc 86, and second slant faces 88d inclined rearwardly from the second blade ridge 88c with respect to the direction of rotation so as to symmetrically converge at the second blade ridge 88c. In FIGS. 4A and 4B, reference numeral 89a represents flanks each positioned on a trailing side of the corresponding cutting chip 88 with respect to the direction R of rotation, and reference numeral 89b represent a slit formed in the rotary disc 86 so as to extend radially inwardly from the tooth root for suppressing resonance of the rotary disc 86. Although not shown, the present invention can make use of any standard band saw for cutting purpose.

In FIG. 2 the corrugated plank preformer 10 referred to above includes a first pusher 10a for transferring each of the corrugated blocks 7 from a standby position, in which the respective corrugated block 7 is held in position having been turned 90° about a longitudinal axis thereof with cells of the corrugated sheet 1a oriented upwardly and downwardly, that is, vertically, to a position upstream of the corrugated plank former 13 in a lateral direction; a third sizing unit 10b which may include a spray gun or an adhesive applicator roll and which is operable to apply an adhesive C to the top face 71 (or a bottom face 72) of the corrugated block 7 while the latter is being fed towards the corrugated plank former 13, a second pusher 10c movable reciprocatingly in a direction perpendicular to the direction of movement of the first pusher 10a. The second pusher 10c is operable to push the corrugated block 7, which has been transferred thereto by the first pusher 10a, towards the preceding corrugated block 7 which has previously been fed to a position upstream of the corrugated plank former 13, until the top face of the corrugated block 7 is joined with the bottom face of the preceding corrugated block 7 to thereby form the elongated flat corrugated plank 9.

The corrugated plank former 13 referred to above includes a fourth sizing unit 13a of a belt type for applying upper and lower faces of the elongated flat corrugated plank 9, upper and lower presser rolls 13b and 13b for urging first and second webs of backing sheets 11a and 11b, fed from respective supply rolls (not shown), so as to bond to the upper and bottom faces of the elongated flat corrugated plank 9 which have been applied the adhesive by the first sizing unit 13a, to thereby provide the continuous strip of corrugated plank 12, and a second drying unit 13c for drying the continuous strip of corrugated plank 12.

The cutting machine 15 referred to above may be employed in the form of, for example, a guillotine cutter using a single blade or a traveling circular saw and is operable to cut the continuous strip of corrugated plank 12 along a cutting line extending transverse to the longitudinal sense thereof to provide a plurality of corrugated cardboard plates 14 of a predetermined size.

Hereinafter, a method of making the corrugated cardboard plates 14 using the cardboard plate manufacturing apparatus 100 of the structure described above will be described.

As shown in FIG. 1, the strip of sheet 1c drawn outwardly from the first supply roll 21 is, as it passes through a nip region between the juxtaposed corrugating rolls 22 and 22, corrugated in conformity to the protrusions 22a on the corrugating rolls 22 and 22 to form the strip of corrugated sheet 1a. As the strip of the corrugated sheet 1a emerges outwardly from the nip region between the corrugating rolls 22 and 22, the corrugated sheet 1a is applied an adhesive by means of the first sizing unit 23 and is then bonded with the strip of liner sheet 1b then drawn outwardly from the second supply roll 24 to provide the continuous strip of corrugated fiberboard 1A.

The continuous strip of corrugated fiberboard 1A is of a structure wherein as shown in FIG. 5 the liner sheet 1b is bonded to the undersurface of the corrugated sheet 1a. At this time, the height H of each of the cells in the corrugated fiberboard 1A, that is, the height as measured between the liner sheet 1b to the top of the corrugated sheet 1a can be adjusted as desired. Specifically, according to the embodiment shown in FIG. 1, since the corrugating rolls 22 and 22 are employed to form the corrugated sheet 1a for eventual formation of the corrugated fiberboard 1A, adjustment of the height of each of the protrusions 22a on each of the corrugating rolls 22 and 22 results in adjustment of the height H1 of the corrugated sheet 1a which in turn results in adjustment of the height H of the corrugated fiberboard 1A as desired. The height H of the cell is, as mentioned before, preferably within the range of 5 to 15 mm.

The continuous strip of the corrugated fiberboard 1A so formed is subsequently reversed upside down as it travels towards the cutting machine 3 and is, while the corrugated sheet 1a of the continuous strip of the corrugated fiberboard 1A is oriented downwards, cut into the corrugated cardboards 1 of a predetermined length. The resultant corrugated cardboards 1 are then successively flied by the juxtaposed skipper rollers 40 and 40 one at a time towards the nipping region between the presser roller 46 and the adhesive applicator roll 44. As the corrugated cardboards 1 are so flied one at a time, adhesive is applied to the undersurface of the corrugated sheet 1a of each of the corrugated cardboards 1 by means of the second sizing unit 42 and the corrugated cardboards 1 are subsequently stacked on the elevating table 60 to thereby form a stack of, for example, ten corrugated cardboards 1.

The stack of the corrugated cardboards 1 resting on the elevating table 60 is, as the elevating table 60 is lowered, transported by a transporter (not shown) underneath the second stopper plate 62 in a direction perpendicular to the plane of the sheet of FIG. 1 and are then transferred onto the conveyor 64 of the press unit 66. The weight applicator unit 65 then applied a weight from above to the stack of the corrugated cardboards 1 then resting on the conveyor 64 to provide the corrugated cardboard laminate 5 in which, thanks to the weight so applied, the bonding strength between each neighboring corrugated cardboards 1 and 1 forming the corrugated cardboard laminate 5 could have been increased. Thereafter, the weight applied is released and the resultant corrugated cardboard laminate 5 is transferred onto the conveyor 67 by means of the stacking machine (not shown) or the robot (also not shown). After a predetermined number of the corrugated cardboard laminates 5 have been stacked on the conveyor 67, they are allowed to stand to dry and are then transported to the subsequent processing station shown in FIG. 2. The weight applicator unit 65 referred to above performs application and release of the weight relative to the corrugated cardboard laminate 5 by the use of an elevating mechanism such as, for example, a ball screw. It is, however, to be noted that instead of the weight applicator unit 65, a press may be employed to apply pressure to the top of the corrugated cardboard laminate 5.

Then as shown in FIG. 2, the plurality of the corrugated cardboard laminates 5 transported by the stack transport unit 68 are then arranged in a row which is in turn pushed from rear by a pusher (not shown) towards a cutting station where the cutting machine 8 is installed. As the row of the corrugated cardboard laminates 5 is so pushed, the corrugated cardboard laminates 5 are successively cut by the rotary cutter 82, driven by the drive motor 81, at a predetermined interval along a cutting line b lying perpendicular to ridge lines a of the corrugated sheets 1a forming a part of the respective corrugated sheets 1a of the corrugated cardboards 1 to thereby provide a number of the corrugated blocks of a generally rectangular box-like configuration. Since the rotary cutter 82 has the circumferentially equally spaced saw teeth 84 that are alternately offset laterally relative to each other to provide two rows of alternating saw teeth as hereinbefore described, upwardly and downwardly oriented, opposite surfaces of each of the corrugated blocks 7, which are respectively bonded to cut fragments of the backing sheets 11a and 11b are suitably roughened in contact with the saw teeth 84.

Each of the corrugated blocks 7 cut successively from the corrugated cardboard laminates 5 is arrayed at a standby position after having been turned 90° about a longitudinal sense of the respective corrugated block 7 so that the cells defined in the corrugated sheet 1a can be oriented upwardly and downwardly, that is, cut faces of the respective corrugated block 7 which have been suitably roughened by the rotary cutter 82 can be oriented upwardly and downwardly. The corrugated blocks 7 having been turned 90° one at a time in the manner described above are then pushed one at a time by the reciprocating motion of the first pusher 10a so as to move from the standby position towards the position preceding the fourth sizing unit 13a. During the movement of each of the corrugated blocks 7 effected by the action of the first pusher 10a, the third sizing unit 10b applies an adhesive to the top faces 71 (or bottom faces 72) of the respective corrugated blocks 7. After the application of the adhesive by means of the third sizing unit 10b, each of the corrugated blocks 7 is pushed by the reciprocating motion of the second pusher 10c towards an array of preceding corrugated blocks 7 that have been previously fed to a position immediately preceding the fourth sizing unit 13a so that the respective corrugated block 7 having its top face 71 (or bottom face 72) applied the adhesive is bonded to the rearmost one of the array of the corrugated blocks 7 which are then forming the elongated flat corrugated plank 9.

As the elongated flat corrugated plank 9 passes through the fourth sizing unit 13a, an adhesive is applied to upper and lower surface thereof, and the first and second backing sheets 11a and 11b drawn outwardly from the respective supply rolls are bonded to the upper and lower surfaces of the elongated flat corrugated plank 9 by means of the upper and lower presser rolls 13b and 13b. At this time, considering that the upper and lower surfaces of the elongated flat corrugated plank 9 are suitably roughened since the corresponding faces of each of the corrugated blocks 7 had been roughened by the rotary cutter 82 at the time the respective corrugated block 7 was formed, the backing sheets 11a and 11b can be assuredly and firmly bonded to the upper and lower surfaces of the elongated flat corrugated plank 9 if the adhesive is properly applied to the upper and lower surfaces of the elongated flat corrugated plank 8 by means of the fourth sizing unit 13a. Accordingly, as compared with the prior art in which surface roughening is performed separately, the corrugated cardboard plates 14 as will be described later can be manufactured at a reduced cost.

Thereafter, the elongated flat corrugated plank 9 having the first and second backing sheets 11a and 11b bonded respectively to the upper and lower surfaces thereof is dried as it is fed through the second drying unit 13c, thereby providing the continuous strip of corrugated plank 12. The continuous strip of corrugated plank 12 is then cut by the cutting machine 15 into the corrugated cardboard plates 14 of a predetermined size. Each of the corrugated cardboard plates 14 can have any desired thickness or height depending on the application thereof if at the time each of the corrugated cardboard laminate 5 is cut by the rotary cutter 82 along the cutting line b the interval between the cutting lines b is properly adjusted so that the resultant corrugated block 7 can have a desired width (the front-to-rear dimension).

Also, since in each of the resultant corrugated cardboard plates 14 the continuous strip of corrugated fiberboard 1A is arranged such that the corrugated sheet 1a thereof have its cells oriented upwardly and downwardly and upper and lower surfaces are backed up by the first and second backing sheets 11a and 11b to provide an integral structure, the respective corrugated cardboard plate 14 has an excellent sound insulating property and an excellent heat insulating property, is lightweight and has a high strength in a direction upwardly and downwardly.

Respective materials for the corrugated sheet 1a and the liner sheet 1b, both forming the corrugated cardboard 1, and the first and second backing sheets 11a and 11b applied to the upper and lower surfaces of the elongated flat corrugated plank 9 may not be limited to a pure pulp material, but may be a material containing a resin. Also, the corrugated cardboard 1 may be of a structure having the corrugated sheet 1a sandwiched between liner sheets. Also, the elongated flat corrugated plank 9 may have only one backing sheet bonded thereto. The corrugated fiberboard former 2 and the cutting machine 3 and the transport and sizing machine 4 shown in FIGS. 1 and 2 may not be always essential and may be dispensed with, and each of the corrugated cardboard laminates 5 may be prepared by laminating a plurality of preformed corrugated cardboards 1.

Also, in the practice of the present invention, the resultant corrugated cardboard plates 14 may be assembled into a multi-layered structure wherein the corrugated cardboard plates 14 are stacked one above the other. In other words, by repeating a process of applying an adhesive to the backing sheet 11a or 11b of one of the corrugated cardboard plate 14, placing and bonding the elongated flat corrugated plank 9 on the adhesive-applied backing sheet of such one of the corrugated cardboard plate 14, applying an adhesive to a surface of the elongated flat corrugated plank 9 and bonding a sheet to the adhesive-applied surface of the elongated flat corrugated plank 9, the multi-layered structure can be obtained. Where the corrugated cardboard plates 14 each having only one surface to which the backing sheet is applied is used, the backing sheet has to be intervened between the adjoining corrugated cardboard plates 14.

When the corrugated cardboard plates 14 are manufactured in the manner described hereinabove, either starch paste or acetic adhesive may be employed. While there should be no problem with the use of the acetic adhesive since the water content in the acetic adhesive is very small, the use of the starch paste would pose the following problem if the inexpensive starch paste is employed to reduce the cost, since the water content thereof is relatively high, for example, about 70%. Specifically, when the first and second backing sheets 11a and 11b are bonded to the upper and lower surfaces of the elongated flat corrugated plank 9 by the use of the starch paste applied thereto by means of the fourth sizing unit 13a to provide the continuous strip of corrugated plank 12, the upper and lower of the continuous strip of corrugated plank 12 are sealed by the first and second backing sheets 11a and 11b. Accordingly, as the continuous strip of corrugated plank 12 is heated to dry, water contained in the starch paste is vaporized to generate a relatively large amount of vapor which will fill up interstices in the continuous strip of corrugated plank 12 then sealed by the first and second backing sheets 11a and 11b. In addition, the force of air confined in and thermally expanded within the continuous strip of corrugated plank 12 as a result of heating, which tends to separate the first and second backing sheets 11a and 11b, increases. For these reasons, the first and second backing sheets 11a and 11b would be separated and would finally be peeled off under influence of the pressure of the vapor and the force of the thermally expanded air.

In order to eliminate the above discussed problem resulting from the use of the inexpensive starch paste, the use of a corrugated plank former 13A of a structure shown in FIG.

6 is preferred to provide the continuous strip of corrugated plank 12. The corrugated plank former 13A shown in FIG. 6 includes pairs of juxtaposed feed rollers 50A and 50B for feeding the elongated flat corrugated plank 9, formed by the corrugated plank preformer 10, in a direction rightwards as viewed therein with the cells oriented upwardly and downwardly while the elongated flat corrugated plank 9 is sandwiched between the pairs of the feed rollers 50A and 50B; a first sizing unit 51 for applying the starch paste to an undersurface of the elongated flat corrugated plank 9, a plurality of guide rollers 52 for feeding the second backing sheet 11b onto the undersurface of the elongated flat corrugated plank 9; a first presser mechanism 53 for advancing the second backing sheet 11b and the elongated flat corrugated plank 9 in unison with each other at the same speed and for pressing the second backing sheet 11b to the undersurface of the elongated flat corrugated plank 9; a hot air supply 54 for blowing a hot air into the cells of the corrugated sheet 1a of the corrugated cardboard 1 forming the elongated flat corrugated plank 9; a second sizing unit 55 for applying the starch paste to a top surface of the elongated flat corrugated plank 9; a plurality of guide rollers 56 for feeding the first backing sheet 11a onto the top surface of the elongated flat corrugated plank 9; and a second presser mechanism 54 for advancing the first backing sheet 11a and the elongated flat corrugated plank 9 in unison with each other at the same speed and for pressing the first backing sheet 11a to the top surface of the elongated flat corrugated plank 9. It is to be noted that it may often occur that the hot air supply 54 may be dispensed with.

Figure 6:
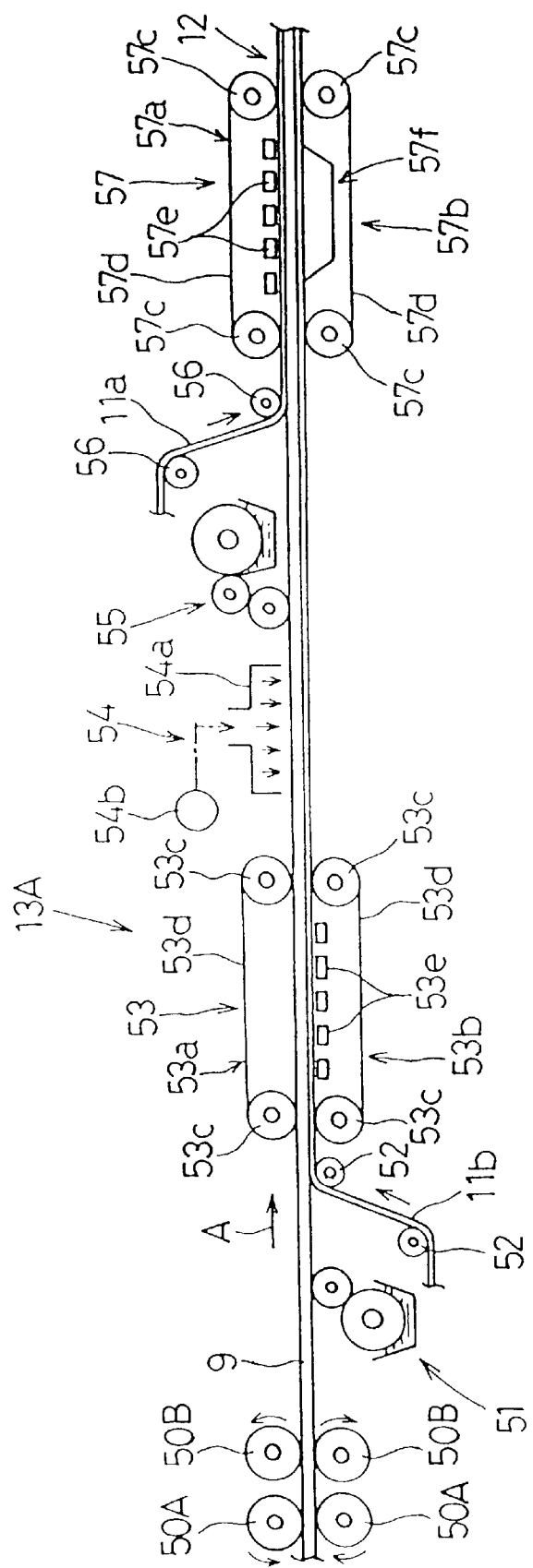
FIG. 6 is a schematic side view showing a corrugated plank former according to another embodiment of the present invention.

The first and second sizing units 51 and 55 shown in FIG. 6 may be identical in structure with the first and second sizing units 23 and 42 shown in FIG. 1.

The first presser mechanism 53 includes first and second belt conveyors 53a and 53b positioned above and below the path of travel of the elongated flat corrugated plank 9. Each of the first and second belt conveyors 53a and 53b includes a pair of rollers 53c and 53c and an endless belt 53d trained around and between the rollers 53c and 53c. However, the second belt conveyor 53b positioned below the first belt conveyor 53a additionally includes a plurality of heaters 53e positioned below a forward run of the endless belt 53d thereof for heating and drying the starch paste, applied to the undersurface of the elongated flat corrugated plank 9, to facilitate adhesion of the second backing sheet 11b to the undersurface of the elongated flat corrugated plank 9. It is to be noted that the endless belt 53d of the first belt conveyor 53a positioned above the second belt conveyor 53b is preferably prepared from a mesh or fabric having a multiplicity of perforations for passage of vapor therethrough.

The hot air supply 54 includes a hood 54a supported above the path of travel of the elongated flat corrugated plank 9, and a hot air blower 54b fluid-connected with the hood 54a. The hot air from the hot air blower 54b is blown into the cells of the elongated flat corrugated plank 9 through the hood 54a.

The second presser mechanism 57 includes first and second belt conveyors 57a and 57b positioned above and below the path of travel of the elongated flat corrugated plank 9. Each of the first and second belt conveyors 57a and 57b includes a pair of rollers 57c and 57c and an endless belt 57d trained around and between the rollers 57c and 57c. However, the first belt conveyor 57b positioned above the second belt conveyor 57a additionally includes a plurality of heaters 57e positioned above a forward run of the endless belt 57d thereof for heating and drying the starch paste, applied to the upper surface of the elongated flat corrugated plank 9, to facilitate adhesion of the first backing sheet 11a to the top surface of the elongated flat corrugated plank 9. Positioned below a forward run of the endless belt 57d of the second belt conveyor 57b is a suction unit 57f for sucking vapor from inside the elongated flat corrugated plank 9. The endless belt 53d of the second belt conveyor 57b is preferably prepared from a mesh or fabric having a multiplicity of perforations for passage of vapor therethrough. However, the sucking unit 57f may often be dispensed with.

Hereinafter, the sequence of manufacture of the corrugated cardboard plates 14 from the elongated flat corrugated plank 9 by the use of the corrugated plank former 13A of the structure described above will be described.

Assuming that the elongated flat corrugate plank 9 formed by the corrugated plank former 10 is supplied in between the feed rollers 50A and 50B and is then advanced towards the first sizing unit 51 in a direction shown by the arrow A in FIG. 6, the starch paste is applied by the first sizing unit 51 to the undersurface of the elongated flat corrugated plank 9. During the continued feed of the elongated flat corrugated plank 9, the second backing sheet 11b is fed through the guide rollers 52 onto the undersurface of the elongated flat corrugated plank 9 and is then fed together with the second backing sheet 11b through a nipping region between the first and second belt conveyors 53a and 53b of the first presser mechanism 53 so that the second backing sheet 11b can be bonded to the undersurface of the elongated flat corrugated plank 9.

During the travel of the elongated flat corrugated plank 9 through the first presser mechanism 53 together with the second backing sheet 11b, the starch paste intervening between the undersurface of the elongated flat corrugated plank 9 and the second backing sheet 11b is heated to dry. At this time, vapor is generated from the starch paste as a result of heating effected by the heater 53e and is immediately purged to the outside. Specifically, since the first backing sheet 11a has not yet been applied to the upper surface of the elongated flat corrugated plank 9 and, therefore, the upper surface of the elongated flat corrugated plank 9 is kept in an open condition, and since the endless belt 53d of the first belt conveyor 53a has a multiplicity of perforations defined therein, the vapor can be quickly purged the outside of the elongated flat corrugated plank 9 through the cells opening at the upper surface of the elongated flat corrugated plank 9 and then through the perforations in the endless belts 53d. Also, air heated by the heater 53e is also purged to the outside through the cells open at the upper surface of the elongated flat corrugated plank 9.

After the elongated flat corrugated plank 9 having the second backing sheet 11b bonded to the upper surface thereof emerges from the first presser mechanism 53, the hot air blown out through the hood 54a from the hot air blower 54b is blown from the upper surface of the elongated flat corrugated plank 9 into the interior of the elongated flat corrugated plank 9 through the cells, allowing the water contained in the starch paste to be vaporized so that the starch paste intervening between the elongated flat corrugated plank 9 and the second backing sheet 11b can be dried immediately with the upper surface of the elongated flat corrugated plank 9 and the second backing sheet 11b consequently bonded together firmly. Since even during the application of the hot air the first backing sheet 11a has not yet been applied to the upper surface of the elongated flat corrugated plank 9 and, therefore, the upper surface of the elongated flat corrugated plank 9 is kept in an open condition, the vapor generated from the starch paste, together with the hot air, can be quickly purged the outside of the elongated flat corrugated plank 9 through the cells opening at the upper surface of the elongated flat corrugated plank 9 without being stagnated.

The elongated flat corrugated plank 9 bonded with the second backing sheet 11b subsequently passes underneath the second sizing unit 55 which applies the starch paste to the upper surface of the elongated flat corrugated plank 9. Thereafter, the first backing sheet 11a drawn through the guide rollers 56 is fed onto the upper surface of the elongated flat corrugated plank 9 and is then fed together with the first backing sheet 11a through a nipping region between the first and second belt conveyors 57a and 57b of the second presser mechanism 57 so that the first backing sheet 11a can be bonded to the upper surface of the elongated flat corrugated plank 9. It is to be noted that in order for the second presser mechanism 57 to be able to accommodate a varying thickness of the elongated flat corrugated planks 9, an assembly including the first belt conveyor 57a and the heater 57e is so designed as to be adjustable in position in a direction perpendicular to the path of travel of the elongated flat corrugated plank 9 either manually or by means of a suitable elevating mechanism.

During the travel of the elongated flat corrugated plank 9 through the nipping region between the first and second belt conveyors 57a and 57b of the second presser mechanism 57 together with the first backing sheet 11a, the starch paste intervening between the upper surface of the elongated flat corrugated plank 9 and the first backing sheet 11a is heated by the heater 57e within the first belt conveyor 57a to dry so that the first backing sheet 11a can be firmly bonded to the upper surface of the elongated flat corrugated plank 9. At this time, although vapor is generated from the starch paste as a result of heating effected by the heater 57e, the amount of the vapor so generated is small. In other words, since the undersurface of the elongated flat corrugated plank 9 had already been bonded with the second backing sheet 11b when the first backing sheet 11a is bonded to the upper surface of the elongated flat corrugated plank 9, the cells in the elongated flat corrugated plank 9 are closed with their interiors sealed from the outside. However, the vapor generated from the starch paste intervening between the elongated flat corrugated plank 9 and the second backing sheet 11b is purged beforehand as hereinbefore described and, therefore, the amount of the vapor generated from the starch paste intervening between the elongated flat corrugated plank 9 and the first backing sheet 11a and subsequently ingressing into the cells in the elongated flat corrugated plank 9 is small.

At the same time, the suction unit 57f provided in the second belt conveyor 57b is driven to draw the vapor remaining in the elongated flat corrugated plank 9 to the outside through the second backing sheet 11b and the perforations in the endless belt 57d. In addition, by the action of the suction unit 57f, the vapor is purged to the outside together with the hot air within the elongated flat corrugated plank 9. Accordingly, the force tending to thermally expand the air within the elongated flat corrugated plank 9 and tending to separate the first and second backing sheets 11a and 11b is lowered. Moreover, since the first and second backing sheets 11a and 11b are made of a paper material such as pulp, the vapor and the hot air can be purged to the outside through these first and second backing sheets 11a and 11b. For these reasons, there is no possibility that the first and second backing sheets 11a and 11b are tended to separate, and the first and second backing sheets 11a and 11b are assuredly and firmly bonded to the upper and lower surfaces of the elongated flat corrugated plank 9 to thereby provide an excellent continuous strip of corrugated plank 12. The continuous strip of corrugated plank 12 so obtained is thereafter cut by the cutting machine 15 shown in FIG. 2 into a plurality of corrugated cardboard plates 14 of a predetermined size.

Figure 7A:
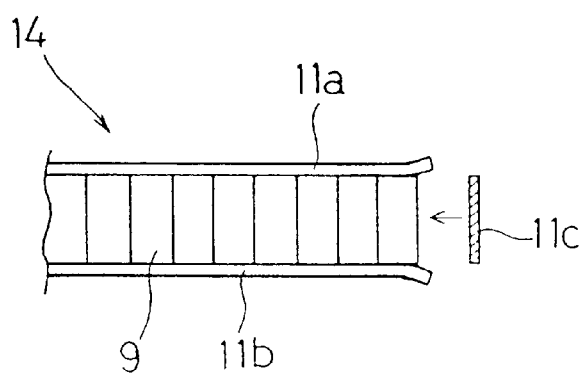
FIG. 7A is a schematic side view showing a manner in which a periphery of the corrugated cardboard plate is concealed with the use of a sheet.
Figure 7B:
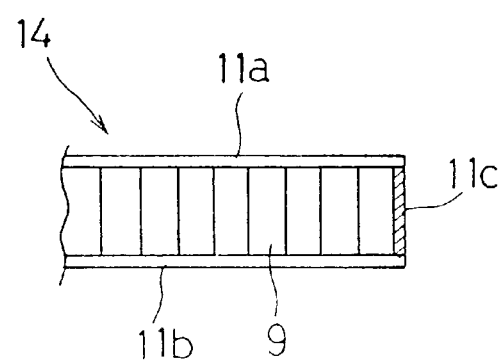
FIG. 7B is a schematic side view showing the periphery of the corrugated card board plate concealed by the sheet.

It may occur that each of the corrugated cardboard plates 14 so manufactured by the apparatus 100 shown in FIGS. 1 and 2 or the corrugated plank former 13A may have its periphery from which the corrugated sheet 1a and/or the liner sheet 11b protrude partly outwardly in the form of a frill. Where the four-sided periphery of each of the corrugated cardboard plates 14 is desired to be finished beautifully, the following procedure may be taken. Specifically, referring to FIG. 7A, side edges of the sheets 11a and 11b bonded to the upper and lower surface of the respective corrugated cardboard plate 14 have to be flared outwardly by the use of, for example, a spatula. Then, as shown in FIG. 7B, an adhesive is applied to the flared side edges of the sheets 11a and 11b, followed by bonding a tape-shaped sheet 11c to the flared side edges of the sheets 11a and 11b to conceal the corrugated sheet 1a and the liner sheet 1b. The tape-shaped sheet 11c may be of the same material as that for any one of the sheets 11a and 11b.

Figure 8:
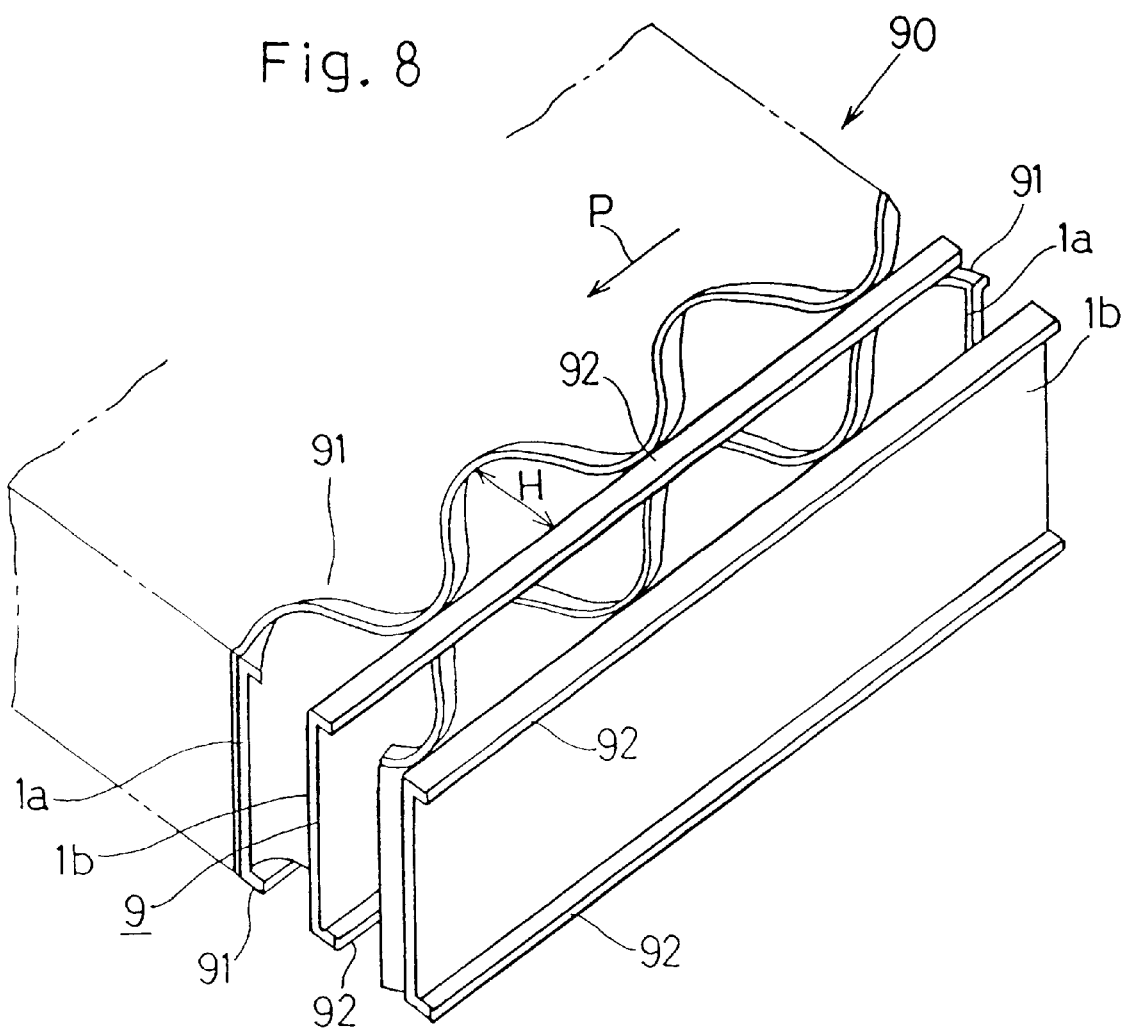
FIG. 8 is a schematic perspective view showing another embodiment of the corrugated cardboard plate.

Also, in the practice of the present invention, such a corrugated cardboard plate as shown by 90 in FIG. 8 can be manufactured by the use of the previously discussed apparatus 100. By preparing the elongated flat corrugated plank 9, having its front (upper) and rear (lower) surfaces lying perpendicular to ridge lines a of the corrugated sheet 1a, from the previously described corrugated cardboards 1 and corrugated blocks 7, the corrugated cardboard plate 90 is provided integrally with a bent portion 91 formed in each of opposite ends of the corrugated sheet 1a that are positioned at the front and rear surfaces thereof, so as to extend in a direction towards the front and rear surfaces thereof. In the embodiment shown therein, a bent portion 92 extending in the same direction as the bent portion 91 provided in the corrugated sheet 1a is also formed in front and rear surfaces of the liner sheet 1b.

Where the corrugated cardboard plates 90 of the structure shown in FIG. 8 are desired to be manufactured, the corrugated cardboard laminate 5 in FIG. 2 obtained by laminating the corrugated cardboards 1 is cut along the cutting line b to provide the plural corrugated blocks 7 by the use of the cutter including the chip saw 85 of the design shown in FIG. 4 (or the rotary cutter 82 shown in FIG. 3). By so doing, cutting margins will be left by the cutting chips 88 at the cut ends of each of the corrugated blocks 7 on a trailing side of the chip saw 85 with respect to the direction of entry P of the chip saw 85 as shown in FIG. 8 and, therefore, the cutting margins so formed are utilized as the bent portions 91 and 92 referred to hereinbefore. Thus, it will readily be seen that with no need to employ a separate processing step, the bent portions 91 and 92 can be formed simultaneously with the cutting of the corrugated cardboard laminate 5.

Figure 9:
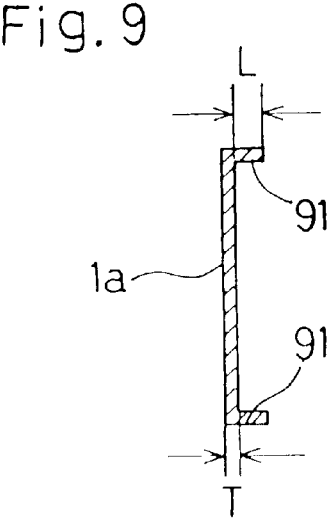
FIG. 9 is a longitudinal sectional view of the corrugated cardboard, showing bent portions formed therein.

At this time, each of the cells in the corrugated sheet 1a preferably has a large height within the range of 5 to 15 mm. This range of height is particularly advantageous in that a relatively small number of the corrugated cardboards 1 is sufficient to the lightweight and resource-saving corrugated cardboard plate 90. Also, as shown in FIG. 9, each of the bent portions 91 and 92 has a length L which is preferably within the range of 1.0 to 5.0 times the thickness T of the corrugated sheet 1a, more preferably L=2T. Selection of the length L within the specified range is effective to increase the physical strength of the resultant corrugated cardboard plate 90 and, when the backing sheets 11a and 11b are to be bonded to the bent portions 91 and 92 as shown in FIG. 2, bonding of the backing sheets 11a and 11b to the bent portions 91 and 92 can be assuredly and firmly achieved. It is, however, to be noted that the bent portions need not be bonded with the sheets and the corrugated cardboard plate 90 with no sheet employed may be prepared.

Hereinafter, results of a bending test subjected to the corrugated cardboard plate 90 to determine the bending strength will be discussed. During the bending test, the corrugated cardboard plate 90 prepared from a corrugated cardboard made up of a liner sheet of 280 g/m² in basic weight (about 1 mm in thickness) and a corrugated sheet of 220 g/m² in basic weight (about 0.5 mm in thickness) were used. The liner sheet has a hill height (cell height) of 10 mm and a hill-to-hill pitch of 18 mm. The corrugated cardboard plate 90 tested has a bent portion of about 1.5 mm in length that is formed at opposite ends of any one of the corrugated sheet and the liner sheet. In addition, each of the upper and lower surfaces of the corrugated cardboard plate tested was bonded with a backing sheet of 280 g/m² in basic weight (about 1 mm in thickness). Corrugated blocks 7 forming the corrugated plate 90 were prepared by the use of the chip saw 85 shown in FIG. 4. Using the corrugated cardboard plate 90 of the above described specification, as shown in FIG. 12B, samples each having a length of 250 mm, a width of 300 mm and a thickness of 25 mm were prepared.

The bending test was carried out by the use of a compression tester commercially available from Toyo Tester Kogyo Kabushiki Kaisha, at a testing speed of 10 mm/min, the span between support points being 200 mm, under a testing temperature of 16° C. and a relative humidity of 65%. For each of the test samples, a three-point bending test was carried out three times and measurements of loads at which buckling took place are tabulated in the table shown in FIG. 12A. In the table of FIG. 12A, the test sample A was prepared by wet cutting in which water was poured over the chip saw 85; and the test sample B was prepared by dry cutting. A reference sample obtained by the use of the circular saw and in which no bent portion is formed in the corrugated and liner sheets of the corrugated cardboard was also tested only for illustrative purpose, the result of which is also shown in the table of FIG. 12A. "Lengthwise" and "Widthwise" both used in the table of FIG. 12A represent respective directions of a plane of a cut plate 120, shown in FIG. 12B, that conform respectively to the direction of pitch of the corrugated sheet and the direction perpendicular to such direction of pitch.

Figures 12A, 12B:
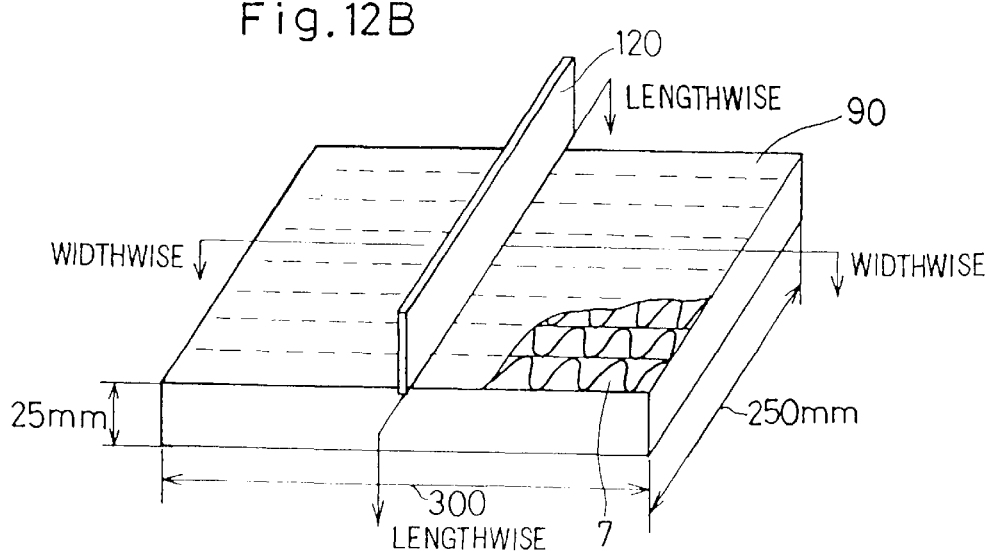
FIG. 12A is a table showing results of bending test carried out to determine the bending strength of the corrugated cardboard plate manufactured in accordance with the present invention.
FIG. 12B is a schematic perspective view of the corrugated cardboard plate under the bending test showing dimensional particulars thereof.

As can readily be seen from the table of FIG. 12A, the test samples A and B have exhibited an increased average bending strength and also an increased unitary bending strength for unitary length (100 mm) in both of the lengthwise and widthwise directions. In view of this, it will readily be seen that the corrugated cardboard plate manufactured in accordance with the present invention has an excellent bending strength.

Figure 10A:
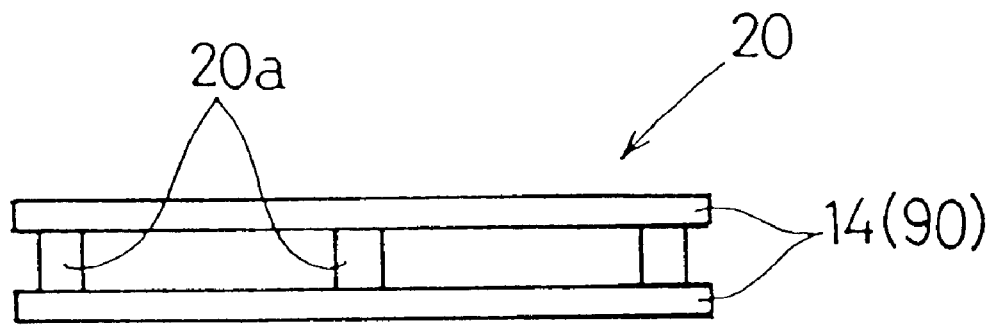
FIG. 10A is a side view showing the corrugated cardboard plates assembled into a load bearing pallet.
Figure 10B:
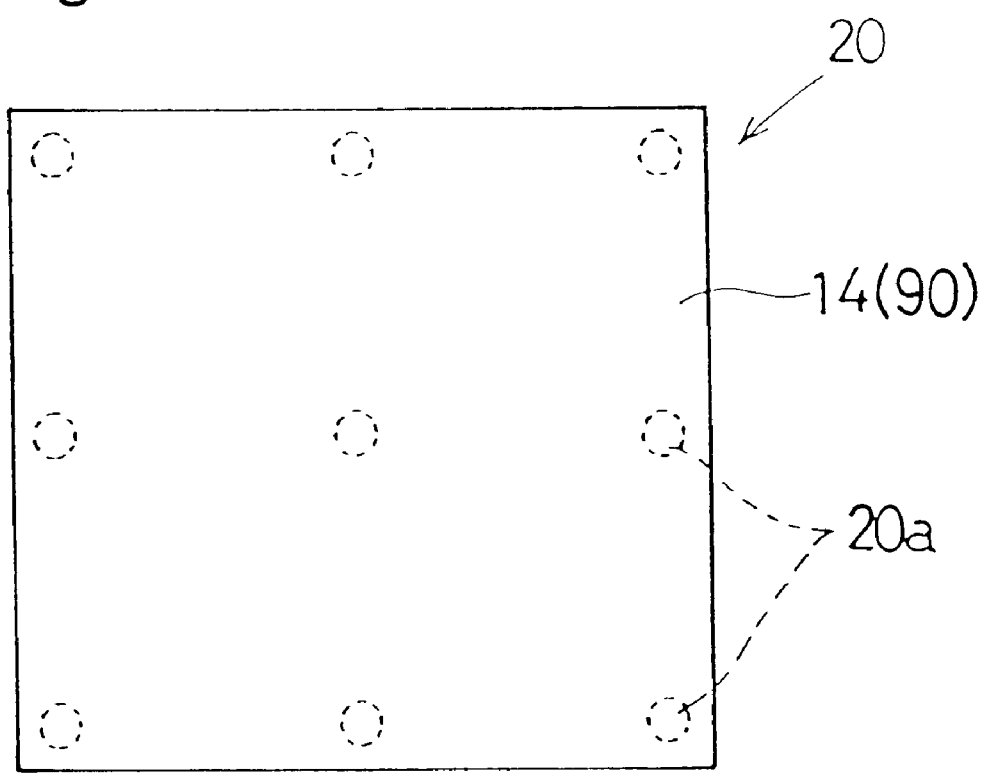
FIG. 10B is a plan view of the pallet shown in FIG. 10A.

The corrugated cardboard plates 14 or 90 manufactured in the manner hereinbefore described can be assembled into and used as, for example, a pallet 20 as shown in FIGS. 10A and 10B. Specifically, the pallet 20 shown therein makes use of two corrugated cardboard plates 14 or 90 with beam members 20a intervening therebetween. The beam members 20a may be prepared from a paper material or, suitably, a paper tube such as disclosed in, for example, the U.S. Pat. No. 5,495,810, wherein a strip of corrugated cardboard is wound spirally to provide the paper tube.

FIG. 11 illustrates an embodiment in which the two corrugated cardboard plates 14 or 90 overlapped to provide a partition wall member 96. Where such a partition wall member 96 is desired, nails or hooks 97 can be driven into the partition wall member 96. In such case, when the two corrugated cardboard plates 14 or 90 are overlapped one above the other with the front side of one of them bonded to the rear side of the other of them, the backing sheets 11a and 11b bonded together and positioned between the two corrugated cardboard plates 14 or 90 will provide a stay for the hooks 97 and, therefore, mounting of the hooks 97 into the partition wall member 96 can be firmly and assuredly achieved. Also, the partition wall member 96 shown in FIG. 11 can be used as an external wall of, for example, a temporary dwelling. Where the partition wall member is used as the external wall, water resistant coating may be formed on outer surfaces of the backing sheets 11a and 11b or water resistant metallic or resinous plate may be fitted to the partition wall member.

Although in any one of the foregoing embodiments, the corrugated sheet has been described and shown as having cells of a generally U-shaped (or sinusoidal) section, but the cells may be of a generally V-shaped or trapezoidal section. In particular, where the corrugated sheet has trapezoidal sectioned cells, the bonding surface area between top sides and the liner sheet increases and, therefore, the strength of the resultant corrugated cardboard plate can be increased.

Also, although in any one of the foregoing embodiments as examples of use of the corrugated cardboard plates 14 or 90 the partition wall member 96 and the load bearing pallet 20 have been enumerated, other than those applications the corrugated cardboard plates 14 or 90 can be used as a core material for a furniture such as, for example, a table, a counter or a shelf; a core material for racks for audio appliances or office automation appliances; a cushioning material for packaging; a corner member for packaging; a filter if a mass of titanium oxide particles or activated carbon particles is filled in the cells; an element for a heat exchanger; and so on. Even in those applications, depending on the necessity, each of the corrugated cardboard plates 14 or 90 may have its front and rear sides coated with a water resistant agent.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method of making corrugated cardboard plates, said method comprising the steps of:

laminating and bonding a plurality of corrugated cardboards to provide a corrugated cardboard laminate, each of the corrugated cardboards including a corrugated sheet and at least one liner sheet bonded to the corrugated sheet, the corrugated sheet having a plurality of cells and a plurality of ridges;

cutting the corrugated cardboard laminate along a plurality of cutting lines lying perpendicular to a direction in which the ridges of the corrugated sheet extend, to provide a plurality of corrugated blocks, each of the corrugated blocks having upper and lower faces opposite each other;

arraying the corrugated blocks in a line to provide an elongated flat corrugated plank in which the upper face of one of the corrugated blocks is bonded to the lower face of the next adjoining corrugated block;

bonding at least one backing sheet, made of paper, to one of opposite surfaces of the elongated flat corrugated plank; and cutting the elongated corrugated plank into a plurality of corrugated cardboard plates of a predetermined size.

2. The method of making the corrugated cardboard plates as claimed in claim 1, wherein during formation of the corrugated blocks, bent portions are formed at opposite ends of the corrugated sheet, that are positioned on front and rear sides thereof, so as to extend in a direction parallel to the front and rear sides by means of cutting performed by a cutter.

3. An apparatus for making corrugated cardboard plates, which comprises:

a laminating machine for making a corrugated cardboard laminate by laminating and bonding a plurality of corrugated cardboards, each of the corrugated cardboards including a corrugated sheet and at least one liner sheet bonded to the corrugated sheet, the corrugated sheet having a plurality of cells and a plurality of ridges;

a corrugated block former for making a plurality of corrugated blocks by cutting the corrugated cardboard laminate along a plurality of cutting lines lying perpendicular to a direction in which the ridges of the corrugated sheet extend, each of the corrugated blocks having upper and lower faces opposite each other;

a corrugated plank preformer for making an elongated flat corrugated plank by arraying the corrugated blocks in a line, in which the upper face of one of the corrugated blocks is bonded to the lower face of the next adjoining corrugated block;

a corrugated plank former for making a continuous strip of corrugated plank by bonding at least one backing sheet, made of paper, to one of opposite surfaces of the elongated flat corrugated plank; and a corrugated plate former for cutting the elongated flat corrugated plank into a plurality of corrugated cardboard plates of a predetermined size.

4. The corrugated cardboard plate making apparatus as claimed in claim 3, wherein the corrugated block former includes a cutter to cut the corrugated cardboard laminate along the cutting lines and to form, during formation of the corrugated blocks, bent portions at opposite ends of the corrugated sheet, that are positioned on front and rear sides thereof, so as to extend in a direction parallel to the front and rear sides.

5. A corrugated cardboard plate manufactured by the method as defined in claim 2, wherein a plurality of corrugated cardboards each including a corrugated sheet and at least one liner sheet bonded to the corrugated sheet are laminated and bonded together, said corrugated cardboard plate comprising the corrugated cardboards having front and rear sides thereof lying in a direction perpendicular to a direction conforming to ridges of the corrugated sheet, said corrugated sheet having end portions positioned on the front and rear sides, respectively, said end portions being bent in a direction conforming to the front and rear sides thereof.

6. The corrugated cardboard plate as claimed in claim 5, wherein each of the bent portions has a length within the range of 1.0 to 5.0 times a thickness of the corrugated sheet.

7. The corrugated cardboard plate as claimed in claim 5, wherein the corrugated sheet has cells of a height within the range of 5 to 15 mm.

8. A corrugated cardboard plate manufactured by means of the apparatus as defined in claim 4, wherein a plurality of corrugated cardboards each including a corrugated sheet and at least one liner sheet bonded to the corrugated sheet are laminated and bonded together, said corrugated cardboard plate comprising the corrugated cardboards having front and rear sides thereof lying in a direction perpendicular to a direction conforming to ridges of the corrugated sheet, said corrugated sheet having end portions positioned on the front and rear sides, respectively, said end portions being bent in a direction conforming to the front and rear sides thereof.

9. The corrugated cardboard plate as claimed in claim 8, wherein each of the bent portions has a length within the range of 1.0 to 5.0 times a thickness of the corrugated sheet.

10. The corrugated cardboard plate as claimed in claim 8, wherein the corrugated sheet has cells of a height within the range of 5 to 15 mm.

* * * * *